United States Patent
Guerin et al.

(10) Patent No.: US 10,296,371 B2
(45) Date of Patent: May 21, 2019

(54) PASSIVE TWO-PHASE COMMIT SYSTEM FOR HIGH-PERFORMANCE DISTRIBUTED TRANSACTION EXECUTION

(71) Applicant: International Business Machines Corporation, Armonk, NY (US)

(72) Inventors: Xavier R. Guerin, White Plains, NY (US); Shicong Meng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 14/215,428

(22) Filed: Mar. 17, 2014

(65) Prior Publication Data

US 2015/0261563 A1   Sep. 17, 2015

(51) Int. Cl.
  *G06F 9/46* (2006.01)
  *G06F 17/30* (2006.01)

(52) U.S. Cl.
  CPC ........ *G06F 9/466* (2013.01); *G06F 17/30979* (2013.01)

(58) Field of Classification Search
  CPC ...... G06F 9/466; G06F 17/30979; G06F 9/52; G06F 11/34; G06F 11/14
  USPC ....................................................... 707/703
  See application file for complete search history.

(56) References Cited

U.S. PATENT DOCUMENTS 5,630,124 A * 5/1997 Coyle, Jr. ........... G06F 11/1471
5,701,480 A * 12/1997 Raz ......................... G06F 9/466
 714/19
5,799,305 A * 8/1998 Bortvedt ................. G06F 9/466
5,999,931 A 12/1999 Breitbart et al.
6,545,981 B1 * 4/2003 Garcia ................ G06F 12/0292
 370/242
6,823,356 B1 11/2004 Novaes et al.
(Continued)

FOREIGN PATENT DOCUMENTS

WO    2005036806    4/2005

OTHER PUBLICATIONS

Zhang, Rui, Zoran Budimlic, William N. Scherer III, "Commit Phase in Timestamp-based STM", 2008, pp. 326-335.*
(Continued)

*Primary Examiner* — Pierre M Vital
*Assistant Examiner* — Alicia M Antoine
(74) *Attorney, Agent, or Firm* — Fleit Gibbons Gutman Bongini Bianco PL; Thomas S. Grzesik

(57) ABSTRACT

In various embodiments a distributed computing node in a plurality of distributed computing nodes executes transactions in a distributed processing system. In one embodiment, a transaction commit message is received from a client computing node for a transaction. The transaction commit message includes at least an identifier of the transaction and a transaction sequence for the transaction. The transaction sequence indicates a sequence of execution for the transaction on the plurality of distributed computing nodes. An entry within the transaction sequence associated with the distributed computing node is identified. The entry includes a sequence number for executing the transaction on the distributed computing node with respect to other transactions. The transaction is executed based on the sequence number in the entry.

13 Claims, 6 Drawing Sheets

(56) References Cited

U.S. PATENT DOCUMENTS

| | | | |
|---|---|---|---|
| 6,971,096 B1* | 11/2005 | Ankireddipally | G06F 9/5038 707/999.1 |
| 7,406,523 B1* | 7/2008 | Kruy | H04L 67/14 709/203 |
| 8,086,566 B2 | 12/2011 | Edlund et al. | |
| 8,266,111 B2 | 9/2012 | Lin et al. | |
| 8,301,593 B2 | 10/2012 | Hoffmann et al. | |
| 8,959,048 B1* | 2/2015 | Rossberg | G06F 17/30371 707/607 |
| 2001/0044792 A1* | 11/2001 | Kikuchi | G06F 17/30362 709/219 |
| 2002/0194015 A1 | 12/2002 | Gordon et al. | |
| 2008/0235245 A1* | 9/2008 | Huras | G06F 9/466 |
| 2008/0313364 A1 | 12/2008 | Flynn et al. | |
| 2009/0049054 A1 | 2/2009 | Wong et al. | |
| 2009/0070774 A1* | 3/2009 | Raikin | G06F 9/524 718/108 |
| 2009/0240664 A1* | 9/2009 | Dinker | G06F 17/30575 707/999.003 |
| 2010/0064070 A1* | 3/2010 | Yoshimura | G06F 13/128 710/22 |
| 2010/0198914 A1* | 8/2010 | Gehrke | G06F 17/30371 709/203 |
| 2011/0041006 A1 | 2/2011 | Fowler | |
| 2011/0119452 A1* | 5/2011 | Heller, Jr. | G06F 9/467 711/147 |
| 2012/0150802 A1 | 6/2012 | Popov et al. | |
| 2012/0278288 A1 | 11/2012 | Deshmkukh et al. | |
| 2013/0036105 A1* | 2/2013 | Lucas | G06F 17/30283 707/703 |
| 2013/0060742 A1* | 3/2013 | Chang | G06F 17/30359 707/704 |
| 2013/0103659 A1 | 4/2013 | Larson et al. | |
| 2013/0226890 A1* | 8/2013 | Markus | G06F 17/30371 707/703 |
| 2013/0297565 A1* | 11/2013 | Starkey | G06F 17/30575 707/634 |
| 2013/0325830 A1* | 12/2013 | Verma | G06F 17/30227 707/703 |
| 2014/0304359 A1* | 10/2014 | Corbett | G06F 3/0614 709/213 |
| 2014/0330767 A1* | 11/2014 | Fowler | G06F 17/30377 707/607 |
| 2014/0337303 A1* | 11/2014 | Little | G06F 17/30371 707/703 |
| 2015/0172412 A1* | 6/2015 | Escriva | G06F 17/30091 709/202 |
| 2015/0193264 A1* | 7/2015 | Hutton | G06F 9/54 719/328 |
| 2015/0248631 A1* | 9/2015 | Brown | G06Q 10/06316 705/7.26 |

OTHER PUBLICATIONS

Takagi, A., "Concurrent and Reliable Updates of Distributed Databases," An IP.com Prior Art Database Technical Disclosure, Dec. 31, 1978, electronic publication date Mar. 30, 2007, IP.com No. IPCOM000149078D.

Wilkinson, W., et al., "Database Concurrency Control and Recovery in Local Broadcast Networks," An IP.com Prior Art Database Technical Disclosure, Dec. 31, 1981, electronic publication date Dec. 8, 2007, IP.com No. IPCOM000161107D.

Kolltveit,H., et al., "Main memory Commit Processing:The Impact of Priorities," Department of Computer and Information Science Norwegian University of Science and Technology, Mar. 2008, pp. 470-477, J.R. Haritsa, R. Kotagiri, and V. Pudi (Eds.): DASFAA 2008, LNCS 4947, Copyright Springer-Verlag Berlin Heidelberg 2008.

* cited by examiner

PASSIVE TWO-PHASE COMMIT SYSTEM FOR HIGH-PERFORMANCE DISTRIBUTED TRANSACTION EXECUTION

BACKGROUND

The present disclosure generally relates to distributed processing systems, and more particularly relates to managing transactions within a distributed processing system.

Distributed transaction execution generally requires complex control systems to guarantee the correctness of the transaction. Compared with executing transactions on a single server, distributed transactions are difficult to implement as they require all participating servers to have a consistent data state after committing a distributed transaction. This implies atomicity for a single transaction, where the transaction must unanimously commit or abort on all servers. For parallel distributed transactions, this requirement further implies that transactions running on distributed servers should commit in the same order as if they are running in a certain sequential order. Achieving these requirements typically involves expensive distributed committing protocols. Existing solutions include traditional distributed two-phase commit protocol and deterministic parallel transactions. However, these approaches are all active in the sense that both client and servers need to actively participate into the committing protocol through message passing. As a result, both clients and servers consume significant resources in executing these protocols, which also limits the throughput and response time one can achieve with this type of active distributed committing protocol.

BRIEF SUMMARY

In one embodiment, a method, with a distributed computing node in a plurality of distributed computing nodes, for executing transactions in a distributed processing system is disclosed. The method comprises receiving a transaction commit message from a client computing node for a transaction. The transaction commit message comprises at least an identifier of the transaction and a transaction sequence for the transaction. The transaction sequence indicates a sequence of execution for the transaction on the plurality of distributed computing nodes. An entry within the transaction sequence associated with the distributed computing node is identified. The entry comprises a sequence number for executing the transaction on the distributed computing node with respect to other transactions. The transaction is executed based on the sequence number in the entry.

In another embodiment, a method for ordering an execution of transactions in a distributed processing system is disclosed. The method comprises identifying a plurality of computing nodes each comprising a set of data associated with a transaction. A set of local transaction sequence information is obtained from each of the plurality of computing nodes. The set of local transaction sequence information identifies an available transaction sequence number for the computing node. A transaction sequence is generated for the transaction based on the obtained set of local transaction sequence information. The transaction sequence orders an execution of the transaction on each of the plurality of computing nodes with respect to other transactions.

In yet another embodiment, a computer program product for executing transactions in a distributed processing system is disclosed. The computer program product comprises a storage medium readable by a processing circuit of a distributed computing node in a plurality of distributed computing nodes, and storing instructions which, responsive to being executed by the processing circuit, cause the processing circuit to perform operations. These operations comprise receiving a transaction commit message from a client computing node for a transaction. The transaction commit message comprises at least an identifier of the transaction and a transaction sequence for the transaction. The transaction sequence indicates a sequence of execution for the transaction on the plurality of distributed computing nodes. An entry within the transaction sequence associated with the distributed computing node is identified. The entry comprises a sequence number for executing the transaction on the distributed computing node with respect to other transactions. The transaction is executed based on the sequence number in the entry.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Existing techniques for distributed transactions are often expensive due to their use of distributed coordination protocols and distributed locks. For instance, one of the most widely used techniques is active two-phase commit (2PC), which involves two round trips of communication among all participating data nodes and holding locks among distributed data nodes during the entire committing process. As a result, the latency of distributed transactions is considerably higher than local transactions and the throughput is also limited. Furthermore, the distributed locks used in active 2PC not only increase data contention, but also introduce distributed deadlocks, which are difficult to detect and expensive to resolve. Also, the availability of 2PC-based systems depends on each individual participating nodes and even a single node failure would cause full-scale transaction aborting on all nodes.

However, various embodiments of the present disclosure provide a passive two-phase commit technique, which utilizes a deterministic state machine to ensure that the resulting state is always the same as long as the input is the same. In one embodiment a global order of all client transactions is maintained, i.e., each participating data node preserves the order of transactions during parallel processing. As a result, the order of transaction execution is the same across all data nodes, which eliminates the need for distributed coordination or distributed locks. Also, the passive two-phase commit technique of one or more embodiments provides low transactional overheads, low latency, and high throughput.

Operating Environment

Figure 1:
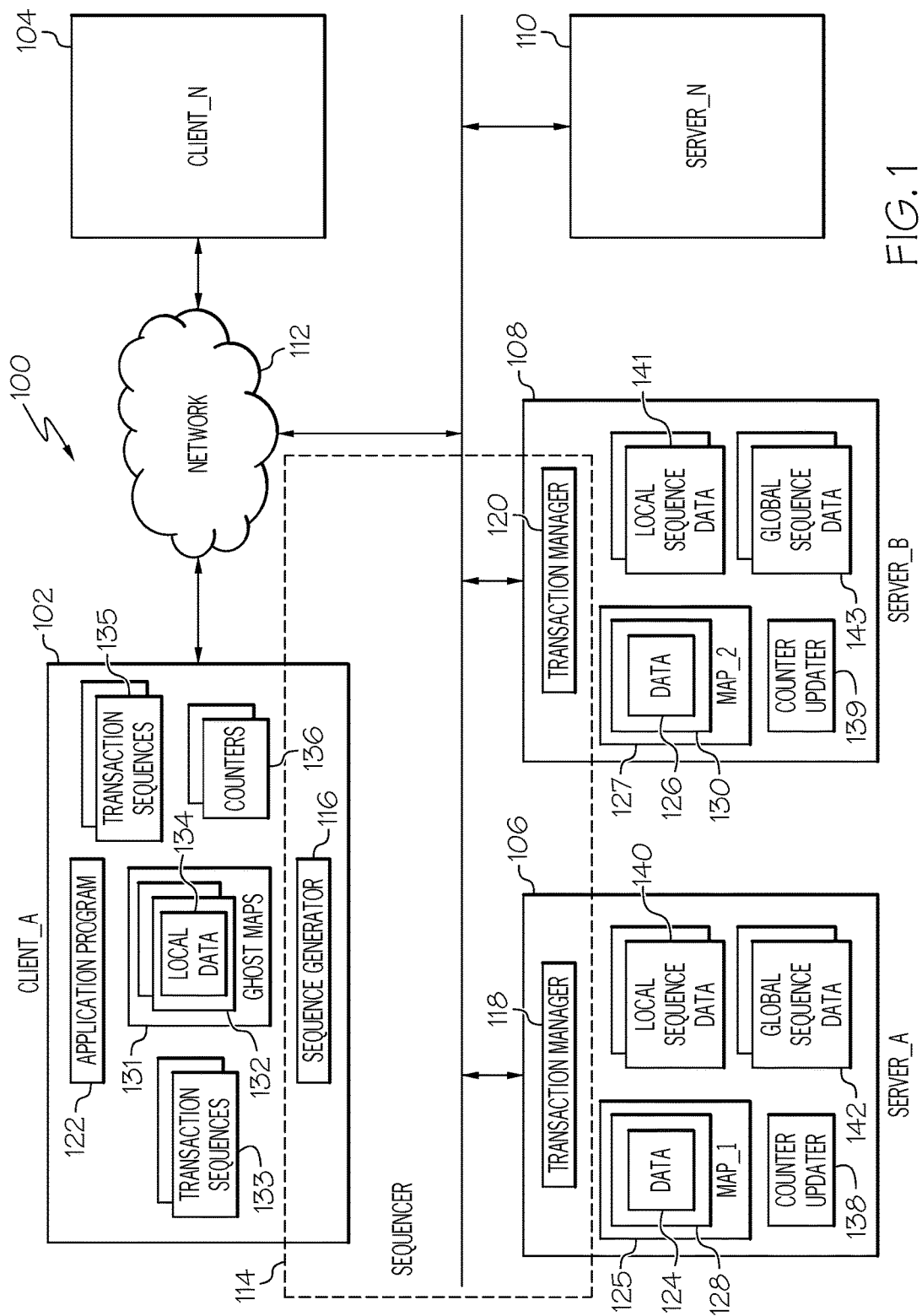
FIG. 1 is a block diagram illustrating one example of an operating environment according to one embodiment of the present disclosure.

FIG. 1 shows an operating environment 100 according to one embodiment of the present disclosure. In one embodiment, the operating environment 100 comprises a plurality of computing nodes interconnected through one or more communication networks. For example, the operating environment 100 comprises one or more client computing nodes 102, 104 that access a distributed network of computing devices such as (but not limited to) server nodes 106, 108, 110 that are connected together by one or more networks 112 such as the Internet and/or local networks.

A transaction sequencer 114 is distributed across each client 102, 104 and server 106, 108, 110 in the distributed operating environment 100. The sequencer 114, in this embodiment, comprises a sequence generator 116 residing at each of the clients 102, 104 and a transaction manager 118, 120 residing at each of the servers 106, 108, 110. As will be discussed in greater detail below, the sequencer 114 utilizes hardware-accelerated remote direct memory access (RDMA) operations to sequence and schedule two-phase commit transactions. By utilizing RMDA, the need for intermediate live two-phase commit entities is avoided. Stated differently, the distributed sequencing process performed by the sequencer 114 for a transaction T involves only the servers/partitions that are relevant to T rather than involving all servers in the system. This drastically reduces latencies and computing resource usage, and also increases the scalability of the distributed transactional engine.

Each client 102, 104 comprises one or more application programs 122 that request transactions on data 124, 126 which is distributed across the servers 106, 108, 110. In one example, the data 124, 126 maintained by each server 106, 108, 110 resides in a portion of memory or other storage area of the server. In one example, the data 124, 126 resides in a portion 125, 127 (e.g., a partition, shard, etc.) of a database distributed across the servers 106, 108, 110. A key-value store (KVS), in one embodiment, can be used to maintain the data 124, 126. A KVS writes a value by associating a key to the value and reads a value by specifying a key associated with the value. In this embodiment, the data 124, 126 is maintained within a map 128, 130, which is a data structure that stores pairs of keys and values. When given a key, a map 128, 130 can locate the corresponding entry that includes its paired value.

When a KVS is implemented, one or more of the servers 106, 108, 110 is a catalog server that maintains partition/map information for the database data. Stated differently, the catalog server stores information that allows that application program 122 to identify the servers 106, 108, 110 on which a given set of data 124, 126 is stored. It should be noted that embodiments of the present disclosure are not limited to distributed databases and key-value stores. Embodiments of the present disclosure are applicable to any type of system and data on which two-phase commit transactions can be performed.

Each client 102, 104 also comprise an area of memory 131 (or storage) that maintains a working (local) copy 134 of data the 124, 126 maintained by the servers 106, 108, 110 required by the corresponding transaction. In one embodiment, the working copy 134 is stored within a data structure referred to as a "ghost map 132" for each transaction requested by the application program 122. During an updating stage, the application program 122 performs one or more operations of a transaction on the working copy 134 of data as compared to the original data 124, 126 stored at the servers 106, 108, 110. A client 102, 104 further comprises a transaction execution sequence 133 generated by the sequence generator 116 for each transaction requested by the application programs 122. As will be discussed in greater detail below, the transaction sequence 133 orders/sequences its corresponding transaction with respect to other transactions being executed on the servers relevant to the transaction.

The clients 102, 104 also comprise a transaction ID generator 135 that generates a unique identified (ID) for each transaction requested by the application program 122. The clients 102, 104 also maintain various counters 136. For example, a client maintains a SUCCESS counter, which tracks the successful locking of data 124, 126 for a transaction at its server 106, 108, 110, and a FAILURE counter, which tracks locking failures for transaction data 124, 126.

The servers 106, 108, 110 each comprise a counter updater 138 that sends lock status information to the clients 102, 104. The clients 102, 104 utilize this lock status information to update their counters 136. Local sequence data 140 and global sequence data 142 are also maintained by each server 106, 108, 110. The local sequence data 140 identifies the next available transaction ID on the server. The global sequence data 142 comprises transaction sequence information for the other servers in the distributed processing system. In one embodiment, the local and global sequence datasets 142, 144 are maintained by one or more counters.

In one embodiment where maps 128 are utilized to maintain and manage data 124 at the servers 106, 108, 110 each partitioned map can be backed by a single server node or multiple server nodes through active replication. Active replication, in one embodiment, is achieved by letting each replica independently execute the same workload, since deterministic parallelism ensures all replicas reach the same state given the same input workload. In some instances, replica servers may progress at different speeds. To address this issue, a primary replica is selected for each partition, and the client node commits its transaction to that primary replica. The primary replica checks the validity of the transaction and waits for the success of the other servers involved in the transactions. The primary replica then asks its secondary replica to execute the transactions and, when all secondary replicas successfully execute the transaction the primary replica executes the transaction itself.

Passive Two-Phase Commit for Transactions

In one embodiment, the application programs 122 utilize a two-phase commit protocol to perform their transactions. A two-phase commit protocol coordinates multiple servers/nodes 106, 108, 110 to perform a single atomic transaction. Atomicity in a computing system is frequently required to guarantee that a series of interdependent transactions are either all performed successfully or all canceled successfully. That is, an atomic transaction either occurs completely, or not at all, but should never occur in part. The servers 106, 108, 110 only commit their respective steps if all the servers in the group are able to commit their steps. If one or more of the servers 106, 108, 110 cannot commit (fail), then each server undoes whatever steps were performed.

As discussed above, conventional two-phase commit techniques generally require substantial communication overhead. These techniques usually result in high latency, increased data contention, and distributed deadlocks. However, embodiments of the present disclosure avoid and overcome the disadvantages of conventional two-phase commit techniques by distributing the sequencer 114 across the client's 102, 104 and the servers 106, 108, 110, which avoids the need for intermediate live two-phase commit entities. This drastically reduces latencies and computing resource usage, and also increases the scalability of the distributed transactional engine.

Figure 2:
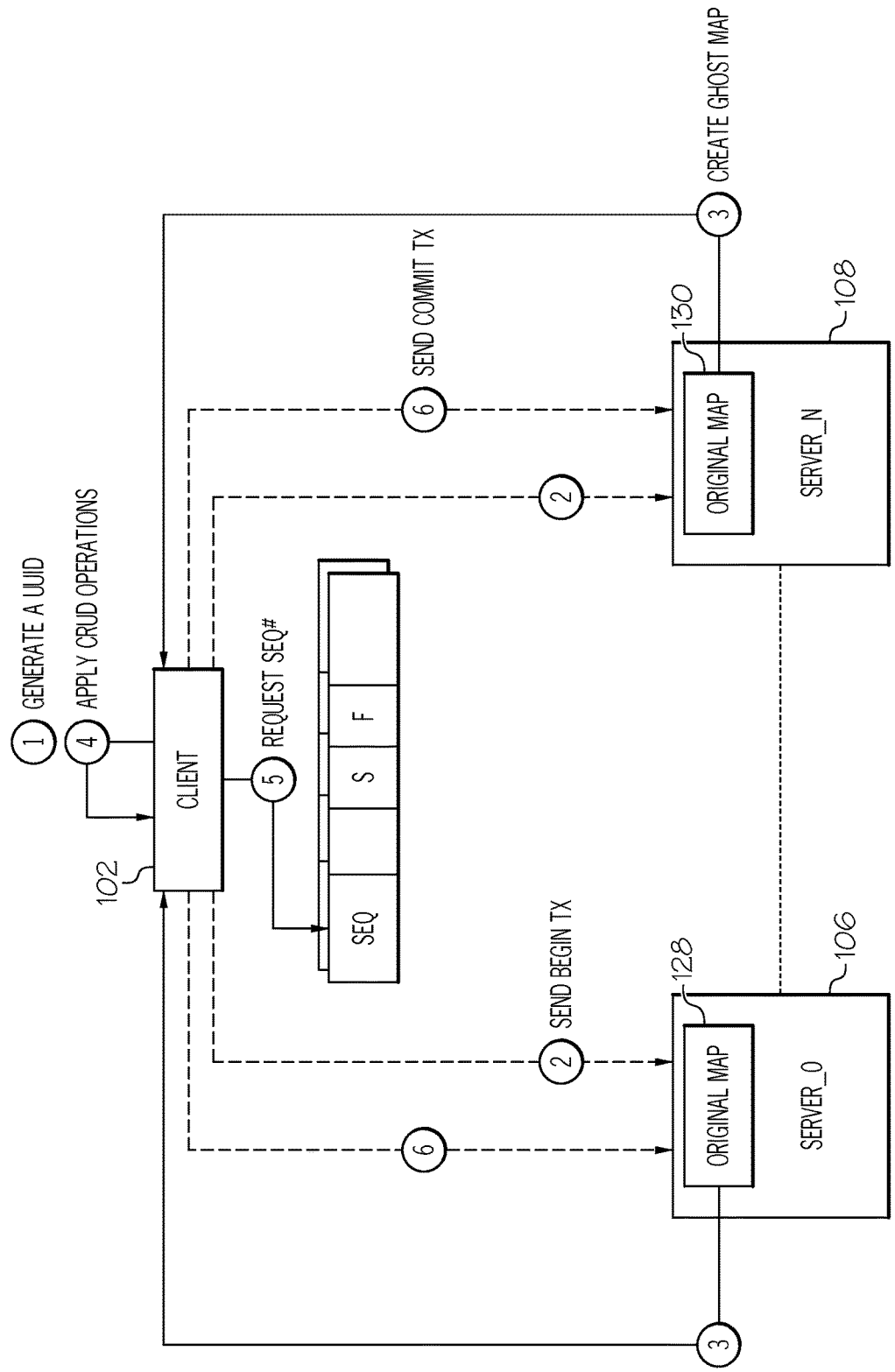
FIG. 2 is a transactional diagram illustrating one example of generating a transaction execution sequence for a distributed computing environment according to one embodiment of the present disclosure.
Figure 3:
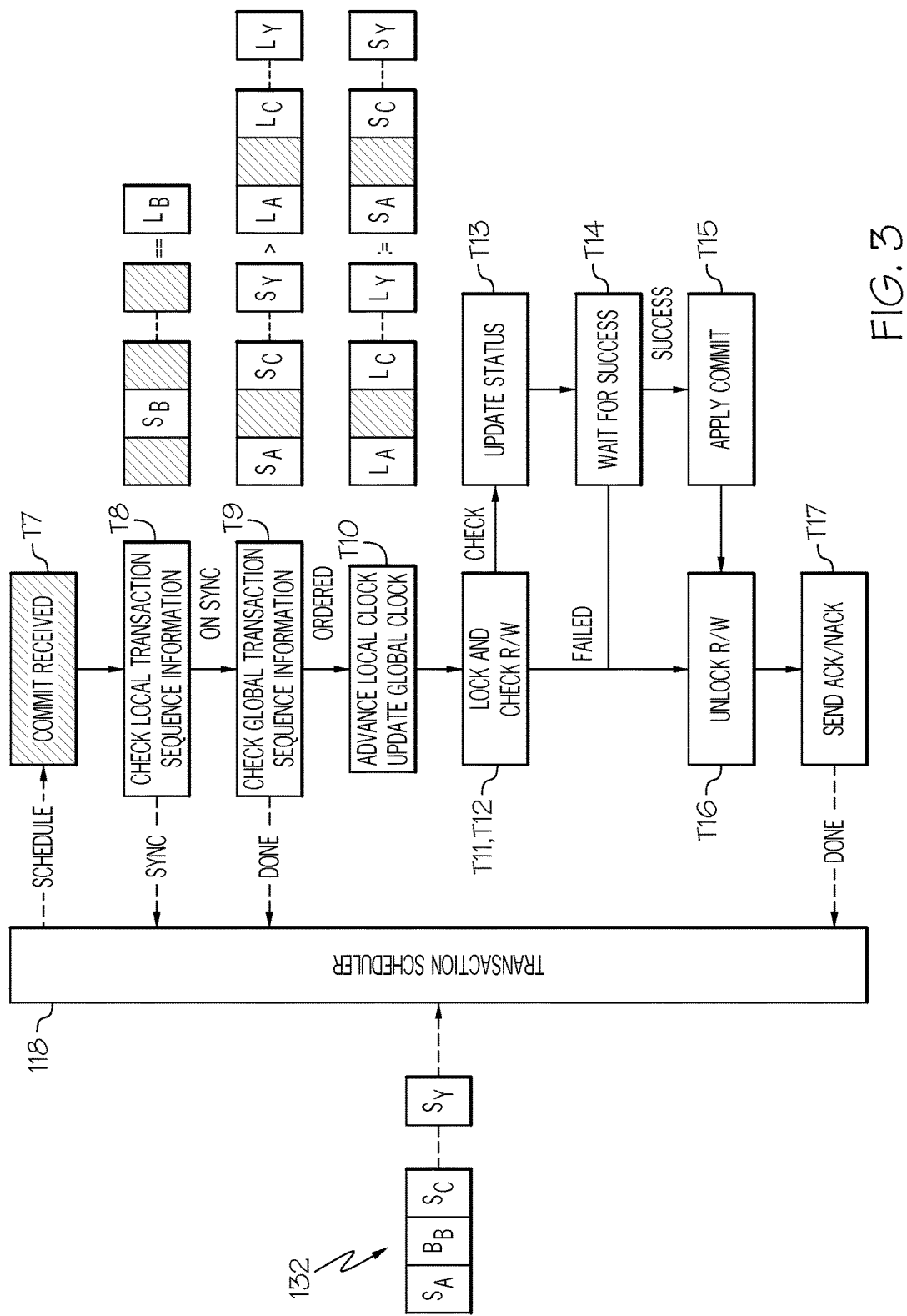
FIG. 3 is a transactional diagram illustrating one example of executing a transaction in a distributed computing environment based on a transaction execution sequence associated with the transaction according to one embodiment of the present disclosure.

Referring now to FIGS. 2 and 3, these figures provide transactional diagrams illustrating an overall process for performing a transaction utilizing the passive two-phase commit protocol of one or more embodiments. In particular, FIG. 2 shows a transactional diagram for generating transaction sequences and FIG. 3 shows a transactional diagram for committing the transaction based on the generated transaction sequences. In one embodiment, the transaction ID generator 135 (or application 122) generates a system-wide unique transaction identifier (UUID) for a transaction, at T1. In this embodiment, when the application program 122 wants to perform a global transaction on a given set of data 124, 126, the application program 122 identifies the servers 106, 108, 110 on which this data 124, 126 resides. For example, if the servers 106, 108, 110 are implementing a KVS the application program 122 analyzes database partition information obtained from a catalog server. The application program 122 identifies the IDs of the servers 106, 108 on which the given set of data 124, 126 is stored based on the partition information. Once the application program 122 has identified the servers 106, 108 it sends a transaction request to each of these servers, at T2. This transaction indicates that the transaction is starting and comprises at least the UUID of the transaction. Other information such as a client ID, local time, etc. can also be included within this transaction request.

The application program 122 obtains a copy 134 of the data 124, 126 required for the transaction from each of the identified servers 106, 108, and stores this working copy 134 in a local ghost map 132, at T3. In one embodiment, the client node 102 utilizes RDMA to issue read commands to the servers 106, 108 for read results in the ghost map 132. However, the client node 102 is able to write results in the ghost map 132 without involving the server. In an example implementing a KVS the data stored within a ghost map 132 only comprises the key-value pairs read/written by the transaction. The application program 122 associates the UUID of the transaction with the ghost map 132. The application program 122 creates a separate ghost map 132 for each of its transaction. In another embodiment, each of the servers 106, 108 generate a ghost map with a working copy of the data 124, 126 accessed by the transaction based on receiving the transaction request from the client node 102. In this embodiment, the servers 106, 108 associate the transaction UUID with each of the ghost maps generated for the transaction.

The application program 122 performs one or more create/retrieve/update/delete (CRUD) operations on the working copy 134 of the data in the corresponding ghost map 132, at T4 (updating stage). If any problems/errors occur while these operations are being performed the application aborts the transaction. Also, if the ghost maps were created at the servers 106, 108 the application program 122 notifies the servers 106, 108 to clean up their ghost maps.

After the application program 122 has successfully performed its operations on the working copy 134 of the transaction data 124, 126, sequencing operations are performed to sequence and order the transaction with respect to other transactions in the distributed system, at T5 (sequencing stage). In this embodiment, the sequencer 114 provides continuous, monotonically increasing sequence numbers for all transactions. For example, the sequence generator 116 of the sequencer 114 uses a single thread to assign sequence numbers to new transactions. The sequence generator 116 creates an in-memory entry that comprises a transaction sequence (TSEQ) assigned to the transaction and two atomic counters 136 (one (S) for successful locking and the other (F) for failed locking). Both counters are initially set to 0. As will be discussed in greater detail below, a transaction sequence 133 comprises a sequence number (SEQ) for each of the servers 106, 108 involved in the transaction. These sequence numbers order the execution of the transaction on the involved servers with respect to other transactions scheduled/executing on the servers.

In one embodiment, the sequence generator 116 utilizes a passive vector clock technique to provide system-wide distributed transactional sequencing, where the computation of the sequence number is done using RDMA without involving the remote server's processor(s). In this embodiment, the sequence generator 116 orders distributed events (i.e., committing of distributed transactions) with partial vector clocks supported by passive remote memory operations. The distributed sequencing process performed by the sequence generator 116 for a transaction T involves only the servers/partitions that are relevant to T rather than involving all servers in the system.

For example, the sequence generator 116 sends a sequence number request via one or more RDMA operations (such as a fetch and add operation) to each of the servers 106, 108 involved in the transaction. The sequence number request, via RDMA, reads the current transaction sequence number from each of the involved servers' local sequence data 140 and sends this sequence number to the client node 102. In this embodiment, the local sequence data 140 of a transactional server i (involved server) is comprised of two counters in memory, an available sequence ID counter with a value $S_i$ and a current transaction ID counter with a value $L_i$. The $S_i$ value represents the next available transaction ID on server i. The $L_i$ value represents the current transaction ID on the server i. The sequence number request reads the current $S_i$ value and increments the $S_i$ value by 1. The $S_i$ value read by the sequence number request is then sent to the client node 102.

In particular, let P(T) denote the set of servers (partitions) $P_i$ that own the data accessed by transaction T. The sequence generator 116 sequentially collects $S_i, i \in P(T)$, in ascending order, either synchronously or asynchronously. The collection is performed by remotely and atomically reading and incrementing the local $S_i$ value/number of the involved servers P(T). This process leverages hardware-implemented RDMA atomic operations, which is highly efficient and requires no participation by the involved servers P(T). For example, the client node 102 invokes a Fetch-and-Add atomic RDMA operation on the server-side counter, which returns the current counter value and increments the counter value atomically. The read $S_i$ value is sent to the sequencer generator 116, which binds the $S_i, i \in P(T)$ together into a transaction sequence (also referred to herein as a "transaction timestamp") of the following form: $\{S_{i_1}, S_{i_2}, \ldots, S_{i_k}\}$ where $i_1 < i_2 < \ldots < i_k$ and $i_1, i_2, \ldots, i_k \in P(T)$.

For example, consider a set of servers (P(T)) $P_A$, $P_B$, $P_C$, ..., $P_k$ involved in a transaction T. Server $P_A$ has a current transaction ID ($L_A$) of 0 and a next available transaction ID ($S_A$) of 4. In other words, server $P_A$ is currently executing a transaction with a transaction ID of 0 and has transactions with IDs 1-3 waiting in a queue to be executed. Server $P_B$ has a current transaction ID ($L_B$) of 1 and a next available transaction ID ($S_B$) of 10. Server $P_C$ has a current transaction ID ($L_C$) of 2 and a next available transaction ID ($S_C$) of 5. Server $P_K$ has current transaction ID ($L_K$) of 7 and a next available transaction ID ($S_K$) of 20. The $S_i$ and $L_i$ values of each server may not be the same since multiple transactions can be executing concurrently and each server may be involved in different transactions at any given time. The sequencer 114 utilizes RDMA operations to read the current $S_A$, $S_B$, $S_C$, ..., $S_K$ values of from servers $P_A$, $P_B$, $P_C$, ..., $P_k$, respectively and increment each of these values by 1.

The sequence generator 116 combines the read $S_A$, $S_B$, $S_C$, ..., $S_K$ values into a transaction sequence 133 comprising an entry field for each of the servers $P_A$, $P_B$, $P_C$, ..., $P_k$ involved in the transaction T. Each entry field comprises a sequence number (SEQ) of the transaction T for the associated server. In the current example, the transaction sequence 133 for transaction T is $S_A$, $S_B$, $S_C$, ..., $S_K$ where $S_A=4$, $S_B=10$, $S_C=5$, and $S_K=20$. This transaction sequence 133 orders the operations of transaction T at each server $P_A$, $P_B$, $P_C$, ..., $P_k$ with respect to the operations of other transactions. In one embodiment, the transaction sequence 133 is generated after the execution of the transaction (in the updating stage where the application program 122 performs operations on the working copy 134) because lock acquiring is performed in strict order and transaction execution time may vary heavily. Acquiring sequence numbers at before or during the updating stage can cause the entire system to wait for a slow transaction to finish.

Once the sequence generator 116 has generated the transaction sequence 133 for the transaction T, the sequence generator 116 packs the transaction sequence 133 sequence with a COMMIT message and sends the COMMIT message to the involved servers (e.g., $P_A$, $P_B$, $P_C$, ..., $P_k$) either synchronously or asynchronously, at T6. The COMMIT message comprises the transaction sequence 133, the working copy 134 of the transaction data 124, 126, and the UUID of transaction T. If the working copy 134 is maintained within a ghost map 132, the ghost map 132 is also sent as part of the COMMIT message.

FIG. 3 shows that each server $P_i$ involved in the transaction T receives the COMMIT message comprising the transaction sequence 133, at T7. The transaction manager 118 of each server $P_i$ utilizes the transaction sequence 133 to order the execution of transaction operations on the server. For example, on a server $P_i$ the transactions are ordered according to the SEQ value in the entry field $C_i$ of the transaction sequencer 132 corresponding to the server's ID i. In the current example, $C_A$ for server $P_A$ comprises SEQ value $S_A$; $C_B$ for server $P_B$ comprises SEQ value $S_B$; $C_C$ for server $P_C$ comprises SEQ value $S_C$; and $C_K$ for server $P_K$ comprises SEQ value $S_K$.

The transaction manager 118 of server $P_i$ checks its global transaction sequence information (local clock) 140, at T8. For example, the transaction manager 118 compares the entry field $C_i$ for its server in the transaction sequence 133 to the $L_i$ value of the server. If $C_i = L_i$, the transaction proceeds. However, if $C_i \neq L_i$ the transaction is delayed at the server until $C_i = L_i$. For example, if $L_B$ for server $P_B$ is 1 and $S_B$ for server $P_B$ is 10 the operations for transaction T on server $P_B$ is placed in a queue until $L_B=10$ (i.e., the operations for transactions 1-9 are performed on server $P_B$). The transaction manager 118 of each server $P_i$ stores the SEQ value from its corresponding entry field $C_i$ of the transaction sequence 133 in the local sequence data 140 of the server.

A server $P_i$ also maintains global sequence data 142. In one embodiment, the global sequence data 142 is an array $M_i$ that comprises the latest transaction sequence entry fields $C_i$ of other servers observed in previous transactions. The transaction manager 118 of a server $P_i$ updates its global sequence data 142 as the server executes new transactions. Once $SEQ_i = L_i$, the transaction is the only transaction to be executed on the entire server until $L_i$ is incremented, i which occurs after the read/write sets are locked. During this grace period, the transaction manager 118 of server $P_i$ checks if the other fields of the transaction sequence 133 are strictly higher than their counterparts in $M_i$, at T9. If the other fields $C_i$ of the transaction sequence 133 are strictly higher than their corresponding values in $M_i$ the fields in $M_i$ are updated with the values found in the transaction sequence 133, at T10. For example, the transaction manager 118 at server $P_B$ determines if the values of $S_A$ (4), $S_C$ (5), ..., $S_k$ (20) in the entry fields $C_A$, $C_C$, ..., $C_K$ of the transaction sequence 133 are higher than the current values of $S_A$, $S_C$, ..., $S_k$ in $M_B$. If so, the transaction manager 118 of server $P_B$ stores the values of $S_A$ (4), $S_C$ (5), ..., $S_k$ (20) from the received transaction sequencer 132 in $M_B$. If one of the fields of the transaction sequence 133 is not strictly higher than its corresponding value in $M_B$, each value in $M_B$ is incremented by 1 and the transaction is aborted. It should be noted that in an embodiment implementing replicas, the sequencing stage discussed above is the same. For example, the sequencer 114 forwards the commit request to all replicas.

After the transaction manager 118 of server $P_i$ has updated the global sequence data 142, the manager 118 sets read/write locks for the data 124, 126 required by the transaction T, at T11 (locking stage). For example, the transaction manager 118 identifies the working copy 134 (and optional ghost map 132) of the data 124, 126 associated with the transaction T via the transaction's UUID. In one embodiment, the working copy 134 (and optional ghost map 132) is transferred onto the servers 106, 108 by the client node 102 utilizing one or more RDMA write operations. The transaction manager 118 then requests the server's internal locking service to lock the original data 124, 126 maintained by the server $P_i$. The locking service ensures sequential consistency of transaction execution by acquiring locks for transactions based on the order established by the transaction sequences received by the server $P_i$.

In one embodiment, the locking service uses a single thread to acquire locks. The lock acquiring thread maintains the largest SEQ value (SEQ*) from the previously observed transaction sequences 133. In this embodiment, the locking thread acquires locks for the transaction with a sequence number SEQ*+1. In the example above, the locking thread of server $P_B$ acquires a lock for the transaction with a SEQ value of $S_B=10$ when SEQ* is equal to 9. This ensures that locks are acquired strictly based on the transaction sequence number, guarantees sequential consistency. The locking services utilize a linked list to store locking requests of different transactions where requests are ordered by the transaction SEQ value. Since the arrival of locking requests may not be the order of their sequence number due to the non-deterministic nature of operating system event scheduling and communication, the locking service may need to wait for a small period of time for the next transactions. This waiting time, however, tends to be fairly small, because the sequencing process itself is quite short and the corresponding timing differences are also small.

In an embodiment where the transaction data 124, 126 is a key-value pair k, the locking service first checks if there are existing locks on the server $P_i$. If no such locks exist, the locking service acquires the lock for the key-value pair k. Otherwise, the locking server adds the lock request to a pending lock queue indexed by the map key, denoted by $Q_p$. An entry of $Q_p(k)$ is a heap of all locking requests on the key-value pair k where the request with the smallest SEQ value is on the top. When a lock on a key-value pair k is released, the locking service checks if the corresponding entry on $Q_p(k)$ is empty. If not, the locking service acquires the lock for the top request. The locking service also checks if a transaction has acquired all its locks after serving a locking request, where each data item on the server that is read or updated by the transaction is associated with a lock. If so, the transaction enters the commit stage of the two-phase commit protocol, at T12. If all locks have not been acquired the transaction wits until all the locks are acquired before it can be executed. It should be noted that in an embodiment implementing replicas only primary replicas of different partitions send their checking results.

During the commit stage of transaction T, the transaction manager 118 of server $P_i$ first checks whether the read results stored in the working copy 134 of the data are the same as those stored in the original data 124, 126 at the server $P_i$, at T13. Such differences are possible because between the start of the transaction where the client 102 performs its operations on the working copy 134 and the end of the locking stage of the transaction T, there may be another transaction T' that commits and changes the value of data items read by the transaction T. When this occurs, the transaction manager 118 aborts the transaction T since it conflicts with the sequential consistency (a transaction should observe the most recent values committed by its immediate precedent transaction).

However, as transaction T is independently executed on partitioned servers, all servers must reach a consensus on whether such differences exist so that they can all commit or abort. To reach a consensus, each server $P_i$ sends a message to the sequencer 114 to indicate its checking results where success means no difference is detected and failure indicates otherwise. The sequencer 114 uses these messages to update the two counters, SUCCESS and FAILURE, at T14. If SUCCESS=N where N is the total number of containers involved in transaction T, the sequencer 114 indicates that all checking succeeds, and all containers should go ahead and commit transaction T, at T15. It should be noted the behavior of a transaction T can be modeled by a deterministic state machine where the input is the read results and its output (updates) does not change if its input is the same. If SUCCESS<N and FAILURE>0, all servers $P_i$ abort T since as at least one server $P_i$ detects changes in read results.

The use of two counters SUCCESS and FAILURE enables the sequencer 114 to distinguish between checking failure and communication failure. For example, consider if only one counter SUCCESS was used to indicate the number of servers $P_i$ whose checking succeeds. Then if SUCCESS<N, one could not determine if this is caused by the checking on at least one servers $P_i$ failing or at least one servers $P_i$ failing to deliver its checking result. Since the latter case cannot be ruled out, a timeout would need to be used to reach consensus, which is prohibitively expensive to use on a frequent basis. However, with SUCCESS and FAILURE counters, the sequencer 114 can timeout if the situation SUCCESS<N and FAILURE=0 lasts sufficiently long, and set FAILURE>0 so that all servers $P_i$ can unanimously abort.

In one embodiment, the transaction manager 118 of each server $P_i$ periodically polls the values of SUCCESS and FAILURE from the sequencer 114 with an RDMA read. To prevent servers $P_i$ from observing inconsistent results on the two counters, the sequencer 114 combines the two counters into a single integer and uses atomic instruction compare-and-swap to update these counters together. If the consensus result is abort, the transaction scheduler 118 releases all locks associated with T through its local locking service and cleanups the ghost map associated with T, at T16. If the result is commit, the transaction manager 118 replaces entries in the main map 128 with the corresponding ones in the ghost map before releasing locks and cleaning up the ghost map, at T16. The transaction manager 118 then notifies the client node 102 whether the transaction was executed successfully or failed to execute, at T17. It should be noted that in an embodiment implementing replicas both primary and secondary replicas poll the sequencer for the consensus result. Since both primary and secondary replicas observe the same results they can independently perform commit/abort in the committing stage.

It should be noted that a transaction abort only suggests that the read of the client-side execution does not follow the sequential consistency. The behavior of committed transactions is still deterministic. The transaction manager 118 can handle aborts in various ways. For example, the transaction manager 118 can abort a transaction and resubmit the job later. The transaction manager 118 can also to re-execute the transaction while holding the locks. However, this cannot completely rule out read-write set changes since the complete set of required lock is not known until all reads finish. For example, consider a scenario where key-value pairs include the next key-value pair to read or NULL (no more reads needed) with a reasonable assumption that a transaction has a finite set of read-write pairs. In this scenario, a transaction is guaranteed to eventually lock all its read-write set with the above approach, but it may detect inconsistency of read-write set every step of the way (finding the next set of key-value pairs to read/write) due to concurrent modifications. In reality, since there are only a fixed number of precedent transactions of T, the concurrent modification reduces quickly as these precedent transactions commit. However, discovering read-write set while holding locks is very expensive. Recall that the locking service processes locking requests of different transactions sequentially. Until its immediate precedent transaction finishes its locking process (with the full discovered set of locks), a transaction cannot start to acquire locks.

In one embodiment, server-side timeouts can be used to avoid clock skewness and racing related issues. However, various events can cause inconsistencies, e.g., different parts of the system do not observe the same events. For example, if serer $S_A$ timeouts and aborts T, server $S_B$ sends in its delayed successful checking result which makes SUCCESS=FAILURE. Server $S_C$ would then observes SUCCESS=N and commit. Once the sequencer 114 obtains the consensus result (commit or abort), it can notify the client 102 about the result without waiting for the server to finish the commit. This does not affect the consistency of the system during failures because replications and recovery allow the system to deterministically reach the same map state with the consensus result (more details of replication and recovery later).

Operational Flow Diagrams

Figure 4:
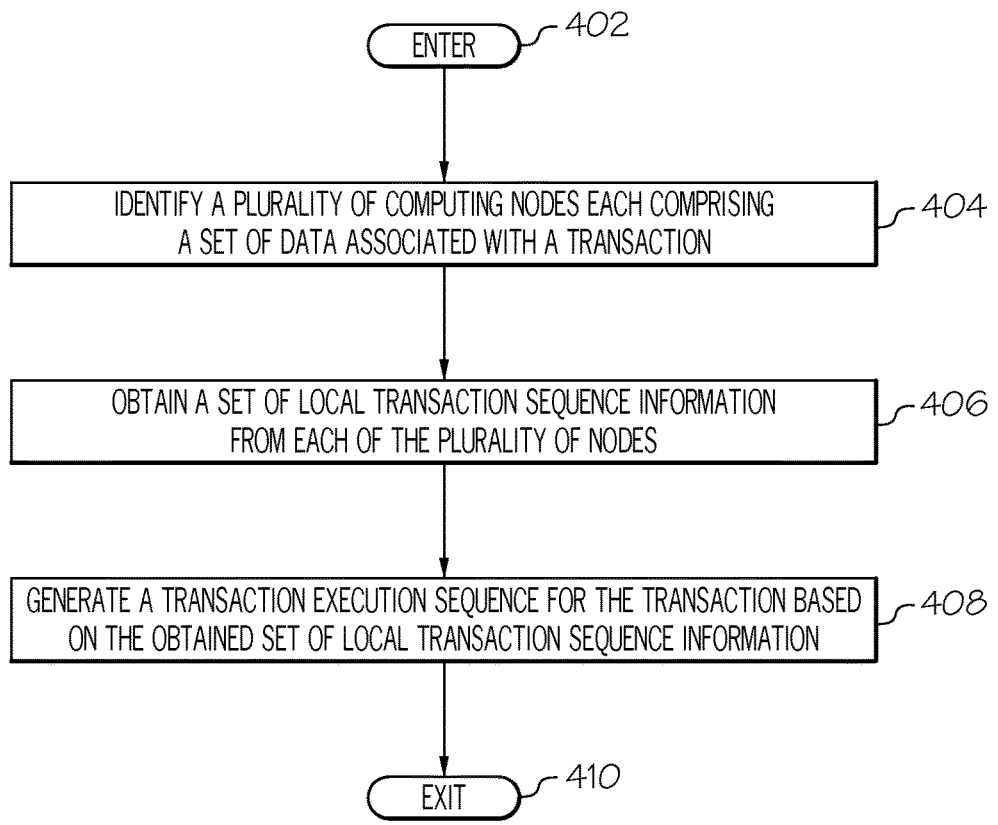
FIG. 4 is an operational flow diagram illustrating one example of generating transaction sequences for ordering the execution of a transaction in a distributed computing environment.

FIG. 4 is an operational flow diagram illustrating one example of generating transaction sequences for ordering the execution of a transaction in a distributed computing environment. The operational flow diagram of FIG. 4 begins at step 402 and flows directly to step 404. The sequencer 114, at step 404, identifies a plurality of computing nodes 106, 108 each comprising a set of data 124, 126 associated with a transaction. The sequencer 114, at step 406, obtains a set of local transaction sequence information 140 from each of the plurality of computing nodes 106, 108. The set of local transaction sequence information 140 identifies an available transaction sequence number for the computing node 106, 108 comprising the information 140. The sequencer 114, at step 408, generates, based on obtaining the set of local transaction sequence information 140, a transaction sequence 133 for the transaction. The transaction sequence 133 orders an execution of the transaction on each of the plurality of computing nodes 106, 108 with respect to other transactions. The control flow exits at step 410.

Figure 5:
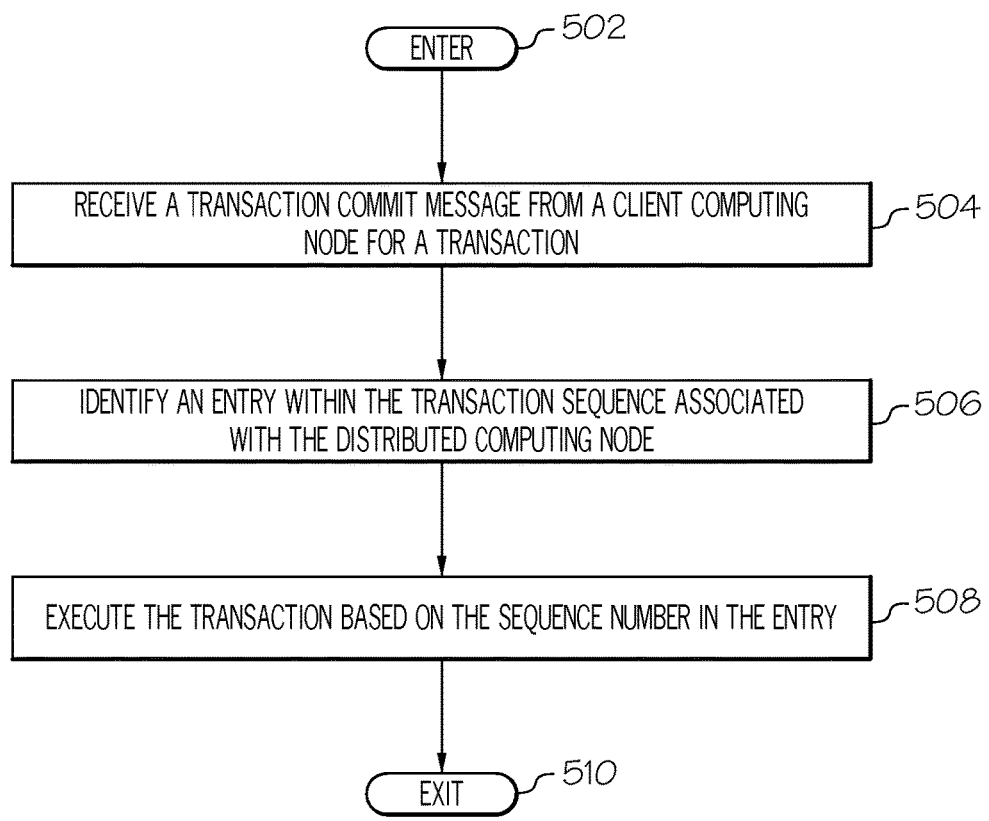
FIG. 5 is an operational flow diagram illustrating one example of executing a transaction in a distributed computing environment based on a transaction execution sequence associated with the transaction according to one embodiment of the present disclosure.

FIG. 5 is an operational flow diagram illustrating one example of executing a transaction in a distributed computing environment based on a transaction execution sequence generated for the transaction. The operational flow diagram of FIG. 5 begins at step 502 and flows directly to step 504. The sequencer 114, at step 504, receives a transaction commit message from a client computing node 102 for a transaction. The transaction commit message comprises at least an identifier of the transaction and a transaction sequence 133 for the transaction. The transaction sequence 133 indicating a sequence of execution for the transaction on a plurality of distributed computing nodes. The sequencer 114, at step 506, identifies an entry within the transaction sequence 133 associated with a given distributed computing node 106. The entry comprises a sequence number for executing the transaction on the given distributed computing node 106 with respect to other transactions. The transaction, at step 508, is executed on the distributed computing node 106 based on the sequence number in the entry. The control flow exits at step 510.

Information Processing System

Figure 6:
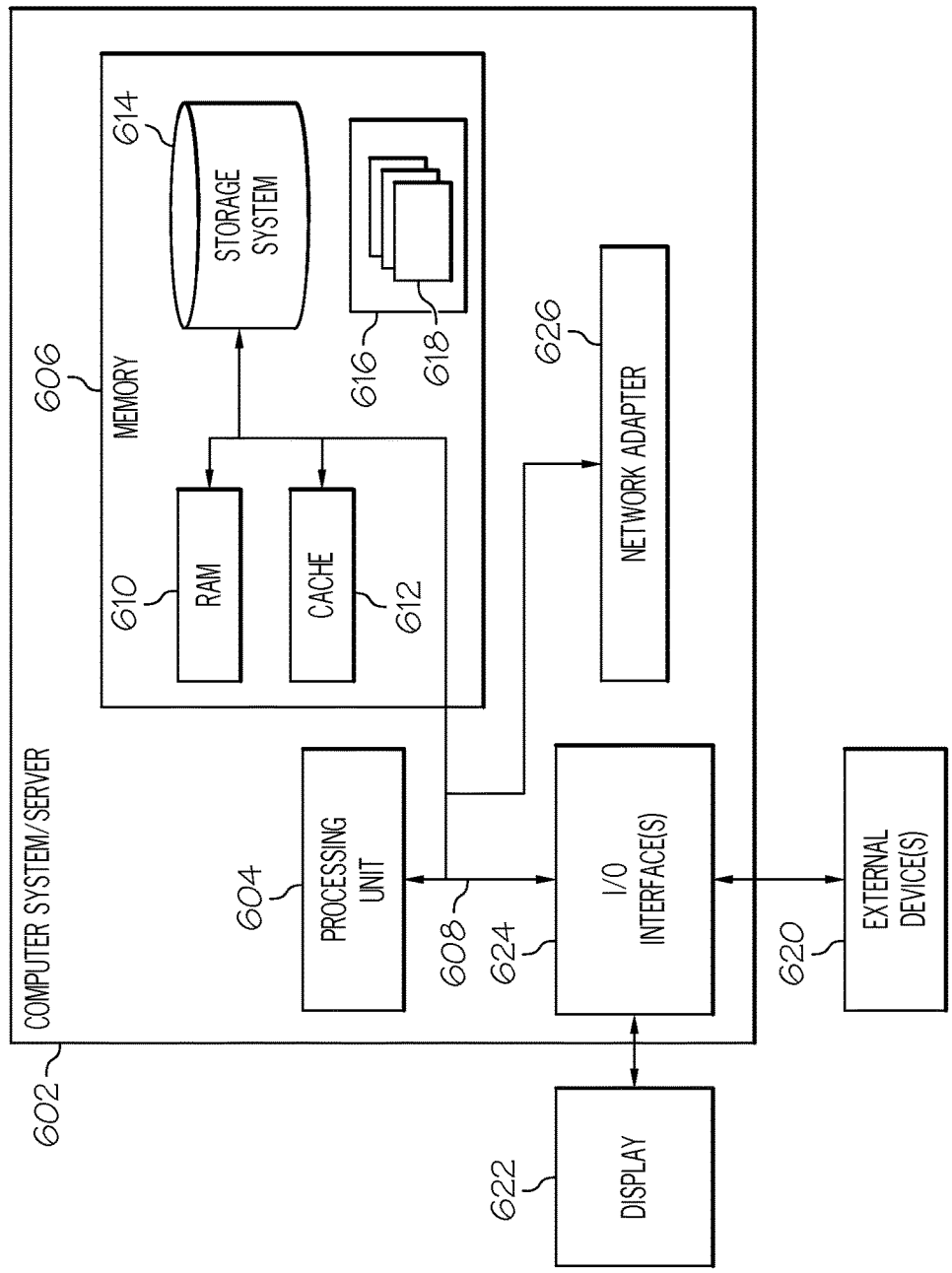
FIG. 6 is a block diagram illustrating one example of an information processing system according to one embodiment of the present disclosure.

Referring now to FIG. 6, this figure is a block diagram illustrating an information processing system, such as the client node 102 or distributed computing node 106 shown in FIG. 1, which can be utilized in various embodiments of the present disclosure. The information processing system 602 is based upon a suitably configured processing system configured to implement one or more embodiments of the present disclosure. Any suitably configured processing system can be used as the information processing system 602 in embodiments of the present disclosure. The components of the information processing system 602 can include, but are not limited to, one or more processors or processing units 604, a system memory 606, and a bus 608 that couples various system components including the system memory 606 to the processor 604.

Although not shown in FIG. 6, the components the client nodes 102, 104 or the distributed computing nodes 106, 108, 110 discussed above with respect to FIG. 1 can reside within the main memory 606 and/or the processor 1004. These components can also be a separate hardware component as well.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 606 can also include computer system readable media in the form of volatile memory, such as random access memory (RAM) 610 and/or cache memory 612. The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 608 by one or more data media interfaces. The memory 606 can include at least one program product having a set of program modules that are configured to carry out the functions of an embodiment of the present disclosure.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the present disclosure.

The information processing system 602 can also communicate with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 602 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 602. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, with a distributed computing node in a plurality of distributed computing nodes, for executing transactions in a distributed processing system, the method comprising:

providing, using one or more remote direct memory access operations, a sequence number to a client computing node based on a transaction having been performed by the client computing node, the sequence number indicating when the distributed computing node may process the transaction in relation to other transactions at the distributed computing node, wherein the one or more remote direct memory access operations provide the sequence number to the client computing node directly from memory without involving a processor of the distributed computing node;

receiving, by the distributed computing node, a transaction commit message from and generated by the client computing node for the transaction, wherein the transaction corresponds to a set of operations previously performed by the client computing node on a local dataset at the client computing node, and wherein the local dataset corresponds to a dataset distributed across the plurality of distributed computing nodes, the transaction commit message comprising at least an identifier of the transaction and a transaction sequence for the transaction, the transaction sequence having been generated by the client computing node, where the transaction sequence comprises a plurality of entries, wherein each entry in the plurality of entries identifies a different distributed computing node in the plurality of distributed computing nodes associated with the transaction, each entry in the plurality of entries comprising a sequence number instructing the distributed computing node identified by the entry when to perform the transaction in relation to operations for at least one other transaction on the distributed computing node identified by the entry, wherein each distributed computing node in the plurality of distributed computing nodes receives the transaction sequence including the entry for each remaining distributed computing node in the plurality of distributed computing nodes as part of the transaction commit message;

identifying, by the distributed computing node from the plurality of entries, the entry associated with the distributed computing node; and executing, by the distributed computing node, the transaction in an order with respect to other transactions on the distributed computing node according to the sequence number in the entry for the distributed computing node.

2. The method of claim 1, wherein executing the transaction further comprises:

comparing the sequence number from the entry to a local sequence number identifying a current transaction; and determining that the sequence number from the entry is equal to the sequence number of the current transaction.

3. The method of claim 1, further comprising:

identifying an entry within the transaction sequence associated with each remaining distributed computing node in the plurality of distributed computing nodes, wherein each entry comprises a sequence number for executing the transaction on the remaining distributed computing node with respect to other transactions;

comparing the sequence number from each entry with a set of global sequence numbers comprising a most recently observed sequence number for each of the remaining distributed computing nodes;

determining, based on the comparing, that the sequence number from each identified entry is strictly higher than a corresponding sequence number in the set of global sequence numbers; and updating, based on the determining, the set of global sequence numbers with the sequence number from each identified entry.

4. The method of claim 1, further comprising:

identifying an entry, within the transaction sequence, associated with each remaining distributed computing node in the set of distributed computing nodes, wherein each identified entry comprises a sequence number for executing the transaction by the remaining distributed computing node with respect to other transactions;

comparing the sequence number from each identified entry with a set of locally stored sequence numbers comprising a most recently observed sequence number for each of the remaining distributed computing nodes;

determining, based on the comparing, that at least one of the sequence numbers from the identified entries fails to be strictly higher than a corresponding sequence number in the set of locally stored sequence numbers;

incrementing, based on the determining, each of the set of locally stored sequence numbers; and aborting, based on the determining, the execution of the transaction.

5. The method of claim 1, further comprising:

locking a set of local data associated with the transaction;

comparing a state of a working copy of the set of local data received from the client computing node with a state of the local set of data;

based on the state of the working copy being different than the state of the set of local data, aborting the execution of the transaction; and based on the state of the working copy being identical to the state of the set of local data committing the transaction.

6. The method of claim 5, wherein aborting the execution of the transaction comprising:

incrementing a transaction failure counter at the client computing node.

7. The method of claim 5, wherein committing the transaction comprises:

incrementing a transaction success counter at the client computing node;

determining that a value of the transaction success counter is equal to a total number of distributed computing nodes involved in the transaction; and committing, based on the determining, the transaction.

8. A computer program product for executing transactions in a distributed processing system, the computer program product comprising:

a non-transitory storage medium readable by a processing circuit of a distributed computing node in a plurality of distributed computing nodes, and storing instructions which, responsive to being executed by the processing circuit, cause the processing circuit to perform operations comprising:

providing, using one or more remote direct memory access operations, a sequence number to a client computing node based on a transaction having been performed by the client computing node, the sequence number indicating when the distributed computing node may process the transaction in relation to other transactions at the distributed computing node, wherein the one or more remote direct memory access operations provide the sequence number to the client directly from memory without involving a processor of the distributed computing node;

receiving a transaction commit message from and generated by the client computing node for the transaction, wherein the transaction corresponds to a set of operations previously performed by the client computing node on a local dataset at the client computing node, and wherein the local dataset corresponds to a dataset distributed across the plurality of distributed computing nodes, the transaction commit message comprising at least an identifier of the transaction and a transaction sequence for the transaction, the transaction sequence having been generated by the client computing node, where the transaction sequence comprises a plurality of entries, wherein each entry in the plurality of entries identifies a different distributed computing node in the plurality of distributed computing nodes associated with the transaction, each entry in the plurality of entries comprising a sequence number instructing the distributed computing node identified by the entry when to perform the transaction in relation to operations for at least one other transaction on the distributed computing node identified by the entry node, wherein the entry for the distributed computing node comprises the sequence number provided by the distributed computing node to the client computing node, and wherein each distributed computing node in the plurality of distributed computing nodes receives the transaction sequence including the entry for each remaining distributed computing node in the plurality of distributed computing nodes as part of the transaction commit message;

identifying, from the plurality of entries, the entry associated with the distributed computing node; and executing the transaction in an order with respect to other transactions on the distributed computing node according to the sequence number in the entry for the distributed computing node.

9. The computer program product of claim 8, wherein executing the transaction further comprises:

comparing the sequence number from the entry to a local sequence number identifying a current transaction; and determining that the sequence number from the entry is equal to the sequence number of the current transaction.

10. The computer program product of claim 8, wherein the operations further comprise:

identifying an entry within the transaction sequence associated with each remaining distributed computing node in the plurality of distributed computing nodes, wherein each entry comprises a sequence number for executing the transaction on the remaining distributed computing node with respect to other transactions;

comparing the sequence number from each entry with a set of global sequence numbers comprising a most recently observed sequence number for each of the remaining distributed computing nodes;

determining, based on the comparing, that the sequence number from each identified entry is strictly higher than a corresponding sequence number in the set of global sequence numbers; and updating, based on the determining, the set of global sequence numbers with the sequence number from each identified entry.

11. The computer program product of claim 8, wherein the operations further comprise:

identifying an entry, within the transaction sequence, associated with each remaining distributed computing node in the set of distributed computing nodes, wherein each identified entry comprises a sequence number for executing the transaction by the remaining distributed computing node with respect to other transactions;

comparing the sequence number from each identified entry with a set of locally stored sequence numbers comprising a most recently observed sequence number for each of the remaining distributed computing nodes;

determining, based on the comparing, that at least one of the sequence numbers from the identified entries fails to be strictly higher than a corresponding sequence number in the set of locally stored sequence numbers;

incrementing, based on the determining, each of the set of locally stored sequence numbers; and aborting, based on the determining, the execution of the transaction.

12. The computer program product of claim 8, wherein the operations further comprise:

locking a set of local data associated with the transaction;

comparing a state of a working copy of the set of local data received from the client computing node with a state of the local set of data;

based on the state of the working copy being different than the state of the set of local data, aborting the execution of the transaction; and based on the state of the working copy being identical to the state of the set of local data committing the transaction.

13. The computer program product of claim 12, wherein aborting the execution of the transaction comprising:

incrementing a transaction failure counter at the client computing node.

* * * * *